(12) United States Patent
Swann

(10) Patent No.: US 8,839,551 B2
(45) Date of Patent: Sep. 23, 2014

(54) SELF-REGULATING GREENHOUSE

(76) Inventor: James J. Swann, Portola, CA (US)

( * ) Notice: Subject to any disclaimer, the term of this patent is extended or adjusted under 35 U.S.C. 154(b) by 711 days.

(21) Appl. No.: 13/175,666

(22) Filed: Jul. 1, 2011

(65) Prior Publication Data

US 2012/0000121 A1    Jan. 5, 2012

Related U.S. Application Data

(60) Provisional application No. 61/360,823, filed on Jul. 1, 2010.

(51) Int. Cl.
*A01G 9/00* (2006.01)
*A01G 9/14* (2006.01)

(52) U.S. Cl.
CPC ..................................... *A01G 9/14* (2013.01)
USPC ............................................................ 47/17

(58) Field of Classification Search
USPC ..................................................... 47/17, 62 A
See application file for complete search history.

(56) References Cited

U.S. PATENT DOCUMENTS

| | | | | |
|---|---|---|---|---|
| 4,045,880 A | * | 9/1977 | Steffen | 34/93 |
| 4,069,593 A | * | 1/1978 | Huang | 34/93 |
| 4,262,656 A | * | 4/1981 | Esposito | 126/620 |
| 4,437,511 A | * | 3/1984 | Sheridan | 165/48.2 |
| 4,713,909 A | | 12/1987 | Roper et al. | |
| 5,101,593 A | * | 4/1992 | Bhatt | 47/17 |
| 5,488,801 A | | 2/1996 | Nix | |
| 5,524,381 A | * | 6/1996 | Chahroudi | 47/17 |
| 7,228,657 B2 | | 6/2007 | Brault et al. | |
| 7,234,270 B2 | * | 6/2007 | Brault et al. | 47/17 |
| 7,501,046 B1 | | 3/2009 | Constantz | |
| 2003/0188477 A1 | | 10/2003 | Pasternak et al. | |
| 2006/0016126 A1 | | 1/2006 | Brorson | |
| 2006/0149422 A1 | | 7/2006 | Dunstan et al. | |
| 2008/0078670 A1 | | 4/2008 | Al-Garni et al. | |
| 2009/0013596 A1 | | 1/2009 | Wang | |
| 2009/0076658 A1 | | 3/2009 | Kinnis | |
| 2009/0133324 A1 | | 5/2009 | Cannon | |

FOREIGN PATENT DOCUMENTS

| | | |
|---|---|---|
| DE | 3824460 | 7/1989 |
| EP | 0121668 A2 | 10/1984 |
| FR | 2510732 | 2/1983 |
| GB | 2119499 | 11/1983 |
| GB | 2219918 | 12/1989 |
| JP | 2000069858 | 3/2000 |
| JP | 2005034043 | 2/2005 |
| JP | 2008304111 | 12/2008 |

* cited by examiner

*Primary Examiner* — Monica Williams
(74) *Attorney, Agent, or Firm* — Kunzler Law Group

(57) ABSTRACT

An apparatus and system are disclosed for a self-regulating greenhouse. The apparatus includes a horizontal air pathway disposed within a growing bed, and a vertical air pathway extending upward from the horizontal air pathway through the growing bed to an air intake apparatus positioned adjacent the roof. The system includes the apparatus and a structure comprising walls and a roof formed of at least a first transparent sheet coupled with a rotatable arm and an adjacent second transparent sheet coupled with an extending arm such that when the extending arm lifts the second transparent sheet an opening is formed in the roof between the first and second transparent sheets to allow a flow of air between an interior of the structure and an exterior of the structure. The system also includes an external surface of formed of a transparent membrane allowing sunlight to enter the structure.

13 Claims, 5 Drawing Sheets

SELF-REGULATING GREENHOUSE

CROSS-REFERENCES TO RELATED APPLICATIONS

This application claims priority to U.S. Provisional Patent Application No. 61/360,823 entitled "A SELF-REGULATING GREENHOUSE" and filed on Jul. 1, 2010 for James J. Swann, which is incorporated herein by reference.

BACKGROUND

1. Technical Field

This disclosure relates to greenhouses and more particularly relates to air circulation systems inside of greenhouses.

2. Description of the Related Art

A greenhouse is a structure for growing plants. Typically, greenhouses are covered with various kinds of materials that allow the transfer of solar radiation to heat up the interior of the structure. These materials include glass or plastic or other transparent materials. Air warmed by the solar radiation is trapped in the building by the roof and walls of the structure, and may be absorbed by the plants and soil inside the structure.

The primary heating mechanism of a greenhouse is convection, or stated differently, the flow of air due to differences in temperature. Hotter air tends to accumulate near the ceiling of the greenhouse, and cooler air tends to accumulate near the floor of the greenhouse. Therefore, a common method for controlling temperature and preventing stagnant air inside of a greenhouse is to vent the greenhouse and allow hotter air to escape, for example, through a ventilation opening in the roof. However, in some climates it is not desirable to allow warm air to vent and therefore the result of prolonged periods of time without venting (i.e., during winter) is stagnant air that is not conducive to growing plants.

SUMMARY

From the foregoing discussion, it should be apparent that a need exists for an apparatus and system for a self-regulating greenhouse. Beneficially, such an apparatus and system would circulate air through a growing bed to transfer heat and moisture into and out of the growing bed.

The present disclosure has been developed in response to the present state of the art, and in particular, in response to the problems and needs in the art that have not yet been fully solved by currently available greenhouses. Accordingly, the present disclosure has been developed to provide an apparatus and system that overcome many or all of the above-discussed shortcomings in the art.

The apparatus, in one embodiment, includes a horizontal air pathway disposed within a growing bed, and a vertical air pathway extending upward from the horizontal air pathway through the growing bed to an air intake apparatus positioned above the growing bed. In one example, the air intake apparatus is positioned above the growing bed a distance of between about 4 and 8 feet.

The growing bed may be a raised growing bed having at least one sidewall. The horizontal air pathway may extend through the sidewall to circulate air from the air intake apparatus. In one embodiment, the apparatus includes a plurality of raised growing beds and a walkway formed between adjacent raised growing beds. Additionally, the apparatus includes a breathable waterproof membrane disposed between the horizontal air pathway and soil in the growing bed to prevent water from entering the horizontal air pathway, and an insulating layer disposed between the horizontal air pathway and the ground.

The apparatus may also include a forced air device in electrical communication with a photovoltaic panel such that the speed of the fan is controlled by the power output of the panel in response to the solar output of the sun.

A system of the present disclosure is also presented. In particular, the system, in one embodiment, includes a structure and the apparatus disposed and adapted to operate within the structure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

References throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided, such as examples of embodiments of the disclosure. One skilled in the relevant art will recognize, however, that the disclosure may be practiced without one or more of the specific details, or with other methods, components, material, and so forth. In other instances, well-known structures, materials or operations are not shown or described in detail to avoid obscuring aspects of the disclosure.

Figure 1:
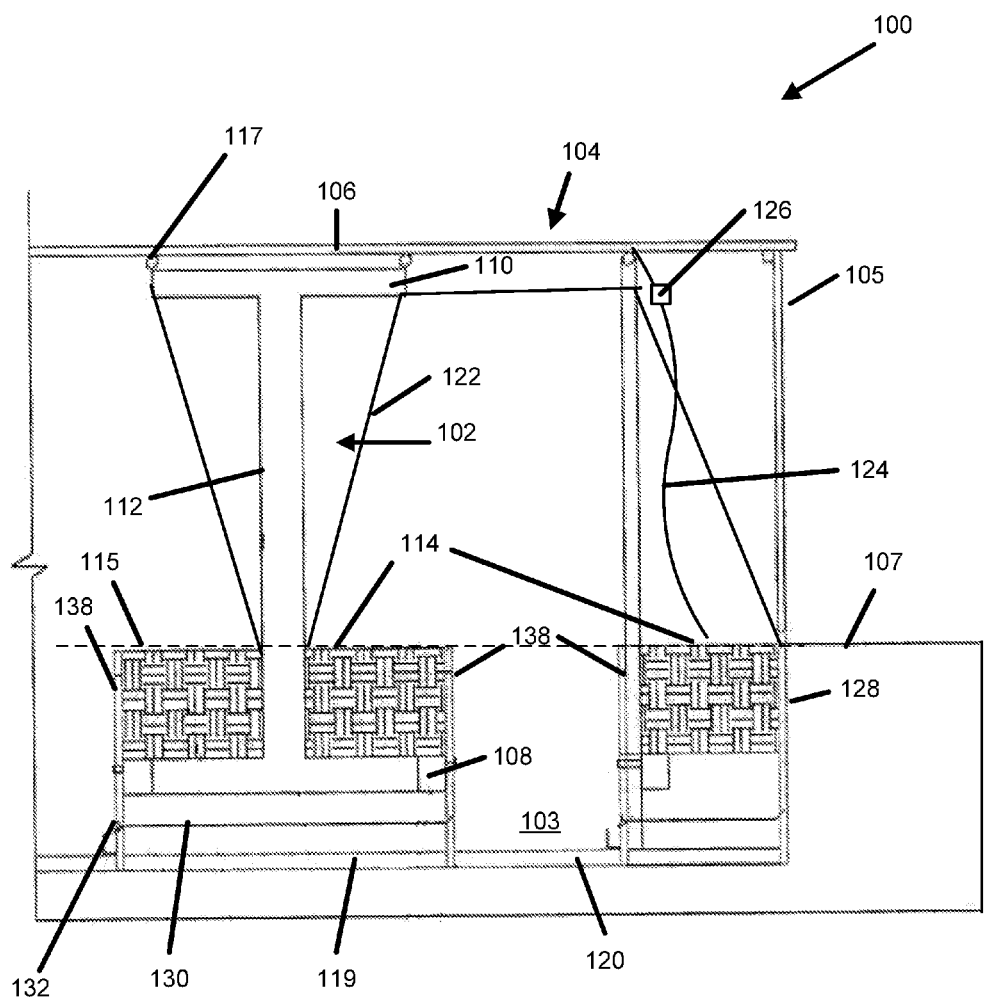
FIG. 1 is a cross-sectional depiction of an embodiment of a self-regulating greenhouse.

FIG. 1 depicts a cross-sectional view of an interior of an embodiment of a greenhouse 100. In this embodiment, a portion of the greenhouse 100 is disposed below ground level 107. The greenhouse 100 comprises an excavated walkway 103. The walkway 103 may be excavated to a depth of two feet below the ground level 107 immediately outside the greenhouse 100, and the walkway 103 may be approximately two feet wide. In other embodiments, the width and the depth of the walkway 103 may be varied to accommodate different needs such as wheelchair access, high traffic flow, or to create a convenient working height for a gardener.

The greenhouse 100 also includes at least one growing bed 114, also depicted here in a cross-sectional view. Each growing bed 114 defines an area for growing plants. In one example, the growing bed is approximately four feet wide and six feet long and extends a height of about two feet above the walkway 103. Alternatively, the growing bed 114 may have dimensions selected according to the type of plant to be grown. Stated differently, a growing bed 114 for a tree may be bigger than a growing bed 114 for flowers, etc. A plane 115 defined by a top of the growing bed 114 may be level with ground level 107 outside the greenhouse 100. In a further embodiment, the growing bed 114 has a width to enable an individual to easily access the entire growing bed 114 while standing or kneeling in the walkway 103.

In some embodiments an interior sidewall 138 of the growing bed 114 may be formed of soil from the growing bed 114; in other embodiments the interior sidewall 138 may be formed of corrugated sheet metal, plastic, or any other material suitable for structural use within a greenhouse 100. As used herein, the term "interior sidewall" refers to a sidewall of the growing bed 114 that is not in contact with an exterior wall of the greenhouse 100. The interior sidewall 138 provides additional support to the growing bed 114 to help maintain its structure. In some embodiments, the interior sidewall 138 is formed of a non-insulating material to help regulate the temperature within the greenhouse 100.

An exterior sidewall 128 contacts an exterior wall of the greenhouse 100. The exterior sidewall 128 may be comprised of sheet metal, plastic, an insulating material, or any other material suitable for structural use within a greenhouse 100. In some embodiments, the exterior sidewall 128 may comprise an insulating material to protect the greenhouse 100 from cold ground temperatures outside the greenhouse 100.

A transparent membrane 104, comprising glass, polycarbonate, or some other transparent material, may be disposed on an exterior of the greenhouse 100. The transparent membrane 104 may be adaptable to match a particular climate or season. In cold climates, multiple layers of the membrane 104 may be used or a non-transparent insulation layer (not shown) may be added above the transparent membrane 104 to further conserve heat. In hot climates, a shade layer (not shown) may be placed over the transparent membrane 104 to provide shade to the greenhouse 100 and to help cool it.

In some embodiments, the greenhouse 100 includes an air flow system 102. The air flow system 102 comprises a lower horizontal ductwork 108 disposed within the growing bed 114, an air intake apparatus 110 positioned near a ceiling 106 of the greenhouse 100 (at a distance of between about 2 and 8 feet above the growing bed), and a vertical air duct 112 connecting the horizontal ductwork 108 to the air intake apparatus 110. The air flow system 102 may also function as structural support for the greenhouse 100. The membrane 104 may be supported by a tube-and-ductwork structure 117, which comprises the air flow system 102, set like joists supporting the ceiling 106. The lower horizontal ductwork 108 may attach to one or more of at least one interior sidewall 138 or at least one exterior sidewall 128 such that the lower horizontal ductwork 108 provides additional support to the growing bed 114. In some embodiments, the greenhouse 100 does not require cement footings.

In one embodiment, approximately a third of the total structure of the greenhouse 100 may be disposed below ground level 107. Disposing a portion of the greenhouse 100 below ground level 107 will discourage infiltration by pests as well as allowing less materials to be used in constructing the greenhouse 100 and also gives the lower third of the greenhouse 100 the benefit of being insulated by the earth around it. By using the natural insulation of the earth to help regulate the greenhouse 100, energy is conserved and less material may be used in building the greenhouse 100.

Furthermore, the excavated walkway 103 helps regulate the temperature of the greenhouse 100. The excavated walkway 103, in one example, is formed between two interior sidewalls 138 that have large surface areas. The interior sidewalls 138 of the walkway 103 utilize the additional exposed surface area of the earth to help regulate the temperature within the greenhouse 100. The additional exposed surface area functions as a "mass storage system." A mass storage system is a system where exposed mass is utilized to absorb and store heat, which may later be released as temperatures cool. In an embodiment of the greenhouse 100, the mass storage system may comprise the interior sidewalls 138 of the growing beds 114 adjacent the walkway 103, the growing beds 114, and/or plant mass.

In a further embodiment, a greenhouse 100 may be constructed over an already existing growing bed 114. An individual would only need to excavate a walkway 103, dispose an air flow system 102 into the existing growing bed 114, and then construct the remaining structure around the growing bed 114.

In an alternative embodiment, the greenhouse 100 may be disposed above ground level 107. In these embodiments, the growing beds 114 may comprise earth and soil, which has been formed into growing beds 114 at ground level 107. The excavated walkway 103 may not be excavated below ground level 107, but may be formed between two growing beds 114.

To further conserve the energy required to regulate the greenhouse 100, it may be beneficial to limit the amount of transparent membrane 104 used in constructing the greenhouse 100. It is believed that in many cases the transparent membrane 104 is a cause of heat loss in cold climates. In some embodiments, the potential heat loss may be minimized by sinking the greenhouse 100 below ground level 107 such that the greenhouse 100 utilizes less transparent membrane 104.

In some embodiments, at least one wall 105 of the greenhouse 100 may be comprised of non-transparent insulating material. The non-transparent wall may be disposed on a side of the greenhouse 100 that is most directly exposed to the cold. In some locations this is a north facing wall. Providing a wall made of insulation may also be beneficial during the winter when snow is being pushed off the greenhouse 100. The snow may be piled on the insulated side of the greenhouse 100 instead of on a non-insulated side that is comprised of transparent membrane 104.

In some embodiments, the ceiling 106 may be four to five feet above ground level 107 outside the greenhouse 100. When measured from a bottom of the excavated walkway 103 the ceiling 106 may be six to seven feet high allowing most individuals to walk within the greenhouse 100. A height of the ceiling 106 may be adjusted based upon the needs of a gardener. In some embodiments, the ceiling 106 may be higher to accommodate a taller individual. In another embodiment, the ceiling 106 may be lower to conserve energy by decreasing an internal volume of air that needs to be regulated.

A four to five foot height of the greenhouse 100 with respect to ground level 107 outside the greenhouse 100 provides less exposure to wind and makes the exterior of the greenhouse 100 and the ceiling 106 of the greenhouse 100 easier to clean and access. For example, in a climate where there is a large amount of snow, the snow could be removed from the top of the greenhouse 100 without the use of a ladder. An individual standing outside the greenhouse 100 with a scraper, a broom, or some other implement would likely be able to access any snow on the greenhouse 100 while standing at ground level 107 outside the greenhouse 100. The lower height of the greenhouse 100 may also make it easier to cover the greenhouse 100 with a layer of insulation in anticipation of a period of cold weather.

In some cold environments, a layer of insulation 119 may be disposed within the growing bed 114 below the horizontal air ductwork 108. The insulation may be insulation of a foam type, a rubber type, or any other insulating material. The insulation layer 119 may provide additional protection to the greenhouse 100 in areas with a frost line that extends below the greenhouse 100.

In climates where water is scarce, a waterproof membrane 130 may be disposed below the horizontal ductwork 108. The waterproof membrane 130 conserves and recycles water by preventing water from being absorbed by the soil below the greenhouse 100. In the embodiment depicted, the waterproof membrane 130 includes a drain 132 adapted to catch excess water from the membrane 130.

A collection path 120, in one embodiment, may be embedded in the excavated walkway 103. The collection path 120 may be comprised of brick, cement, packed dirt, gravel, or any other suitable material. In some embodiments a lattice assembly 122 may be disposed within the greenhouse 100. The lattice assembly 122 may be disposed with a lower end in or near the growing bed 114 and with a top end near the ceiling 106. The air intake apparatus 110 may be adapted to support the top end of the lattice assembly 122. The lattice assembly 122 may provide a structure for vines to grow on.

In the depicted embodiment, the greenhouse 100 comprises a water supply system 124. The water supply system 124 may use the tube-and-ductwork structure 117 to transport water throughout the greenhouse 100. The water supply system 124 may be in communication with misters 126 or sprinklers (not shown). The water system 124 may be used to provide water to the greenhouse 100 when it is dry, cool the greenhouse 100 when it is hot by providing cool water, or heat the greenhouse 100 when it is cold by providing warm water. The water supply system 124 may be controlled by a computer device or by a manual valve. The water supply system 124 may be gravity fed or may be fed by a pump.

Using the tube-and-ductwork structure 117 as part of the water system 124 may provide the benefit of conserving materials that are required to build the greenhouse 100 by not requiring the installation of both a structural system and a water system. Using the tube-and-ductwork structure 117 as part of the water system 124 may also aid in regulating the greenhouse 100. The tube-and-ductwork structure 117, in one embodiment, may be exposed to the sunlight causing water within the structure 117 to be warmed. The warmed water may be used to regulate the greenhouse by watering the growing bed 114 causing the temperature of the soil to rise, or the warmed water may regulate the temperature of the greenhouse 100 by acting as a mass storage system.

Figure 2A:
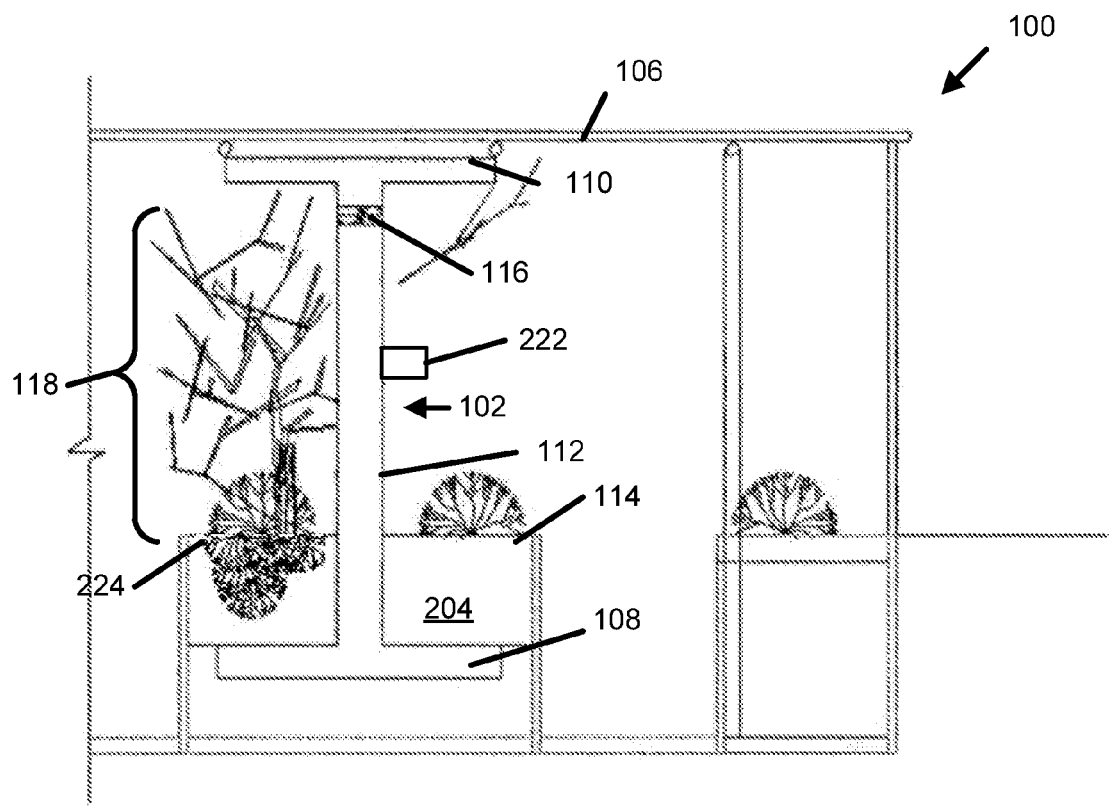
FIG. 2A is a cross-sectional depiction of another embodiment of a self-regulating greenhouse.

FIG. 2A depicts a cross-sectional view of an interior of an embodiment of a greenhouse 100. In this embodiment, the greenhouse 100 comprises an air flow system 102. The air flow system 102 comprises a lower horizontal ductwork 108 disposed below soil 204 in a growing bed 114, an air intake apparatus 110 near a ceiling 106 of the greenhouse 100, and a vertical air duct 112 connecting the horizontal ductwork 108 to the air intake apparatus 110.

Figure 2B:
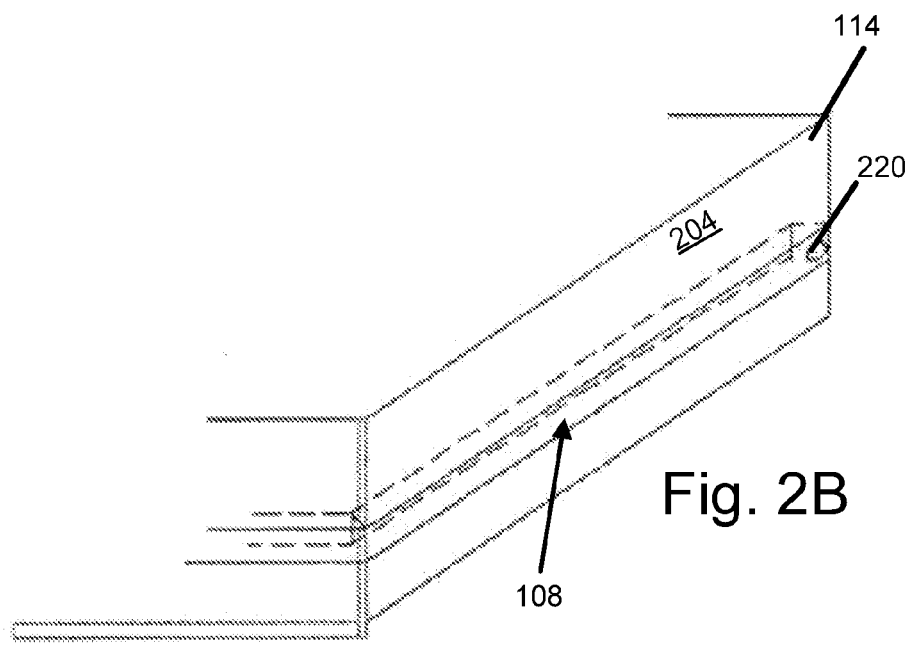
FIG. 2B is a perspective view of an embodiment of a horizontal ductwork.

The horizontal ductwork 108 may comprise perforations, an inverted "U" shape, or any other opening such that the ductwork 108 is open to the soil 204. FIG. 2B depicts a close up of the horizontal ductwork and depicts the horizontal ductwork traveling around the edge of the growing bed 114. The ductwork 108 comprises an exhaust hole 220 in the side of the growing bed 114 that allows air to escape back into the greenhouse 100. In some embodiments, when air travels into the horizontal ductwork 108 it may travel a distance of approximately eight feet under the soil 204 before it exits through the exhaust hole 220.

The air flow system 102 further comprises a forced air device for moving air through the air flow system 102. For example, the forced air device may be a fan 116 disposed within the air intake apparatus 110. The fan 116 may be a simple 12 volt fan. In some embodiments, the fan 116 may be in communication with a photovoltaic panel (not pictured), such that the speed of the fan 116 is directly and completely controlled by the power output of the photovoltaic panel. In other embodiments, the fan 116 may be controlled by a computer, a manual control device, a rheostat, thermostat, or some other method of adjusting the speed of the fan 116.

In the example of the fan 116 controlled by the output of a solar panel, the fan 116 will naturally regulate the internal environment of the greenhouse 100 by changing speed based upon radiation emitted by the sun. As the sun climbs in the sky during the day and emits more radiation both the temperature of the greenhouse 100 will increase and the voltaic panel will put out more power causing the fan 116 to spin faster. As the fan 116 spins faster it will draw hot humid air, which tends to accumulate near the ceiling 106 of the greenhouse 100, in through the air intake apparatus 110 and transport that air through the vertical air duct 112 into the horizontal ductwork 108. The horizontal ductwork 108 will expose the hot humid air directly to the soil 204 in the growing bed 114 causing the soil to absorb the heat and moisture, and subsequently allow the moisture to be reabsorbed by the roots 224. The air, which is now cooler and dryer, will exit the horizontal ductwork 108 through the exhaust hole 220 and circulate back into the greenhouse 100.

By processing the air through the air flow system 102 in this way, the air will be prevented from growing stagnant, the temperature and the humidity of the air will be maintained at a level more beneficial for plant growth, and the soil 204 will be warmed and moistened by the processing air. The air flow system 102, in one embodiment, decreases the humidity within the greenhouse 100 from ninety percent humidity to between fifty percent and sixty percent humidity.

The air flow system 102 in this embodiment is well suited to a variety of climates because it controls both the temperature of the greenhouse 100 and the humidity of the greenhouse 100. In a cold climate, during the heat of midday the air flow system 102 will drive hot air into the soil 204 causing the soil 204 to absorb and store the heat to provide the plants 118 warmth during the evening and night. The fan 116 may be run slowly or in reverse and may be powered by a supplemental battery (not shown) such that during night the battery will power the fan to circulate air from below the soil, which has been warmed by hot air during the day, and push it out through the air intake apparatus 110 which will prevent inversion layers. Alternatively, the fan 116 may be powered by an alternating current power system. In some cold climates, it may be necessary to cover the greenhouse 100 with an insulation layer (not shown) at night or during cold periods.

In some embodiments an additional power source (not shown) may also be in communication with growing or LED lights 222 that are disposed within the greenhouse 100. The additional power source may be the supplemental battery that was disclosed above or it may be a separate power source. The additional power source may be connected to photovoltaic panels that charge the power source during the day. The LED lights 222 may be activated only at night. The LED lights 222 may be in communication with a timer that turns the LED lights 222 on and off at the appropriate time, or the LED lights 222 may automatically turn on when the lighting dims and be allowed to run until the additional power source runs out of power.

The LED lights 222 may be used to increase the period of exposure to light for the plants 118 during morning and twilight hours. The LED lights 222 may be useful in northern climates during the winter when there is less sunlight during the day. The lights 222 may be turned on for only a couple of hours a day.

In some embodiments, different colors of LED lights 222 or different colors of lenses may be provided that are adjustable to create an ideal lighting for a given plant species. The LED lights 222 or lenses may be three colors such as red, yellow, and blue or red, green and blue such that the LED lights 222 or lenses are able to provide a sufficiently wide spectrum. The LED lights 222 or lenses may be computer controlled to provide a particular light spectrum and intensity to the plants 118.

The fan 116, rotating at a low speed, may also be used to create convection currents in the air during the night. In other embodiments, candles (not shown) may be placed in the greenhouse 100 during cold times to add energy and power to create convection currents in the air in the greenhouse 100. Using fans, candles or any other source of heat will create convection currents in the air within the greenhouse 100 to both warm and prevent the air from becoming stagnant.

In a dry or hot climate, the air flow system 102 may conserve water by driving humid air into the soil 204 allowing the roots 224 to utilize the humidity as a source of water. Furthermore, driving the hot air into the soil 204 will cool the circulated air by allowing the soil 204 to absorb some of the heat. In some embodiments, misters (not shown) may be placed within the greenhouse to provide additional moisture and to also aid in cooling the air.

Figure 3:
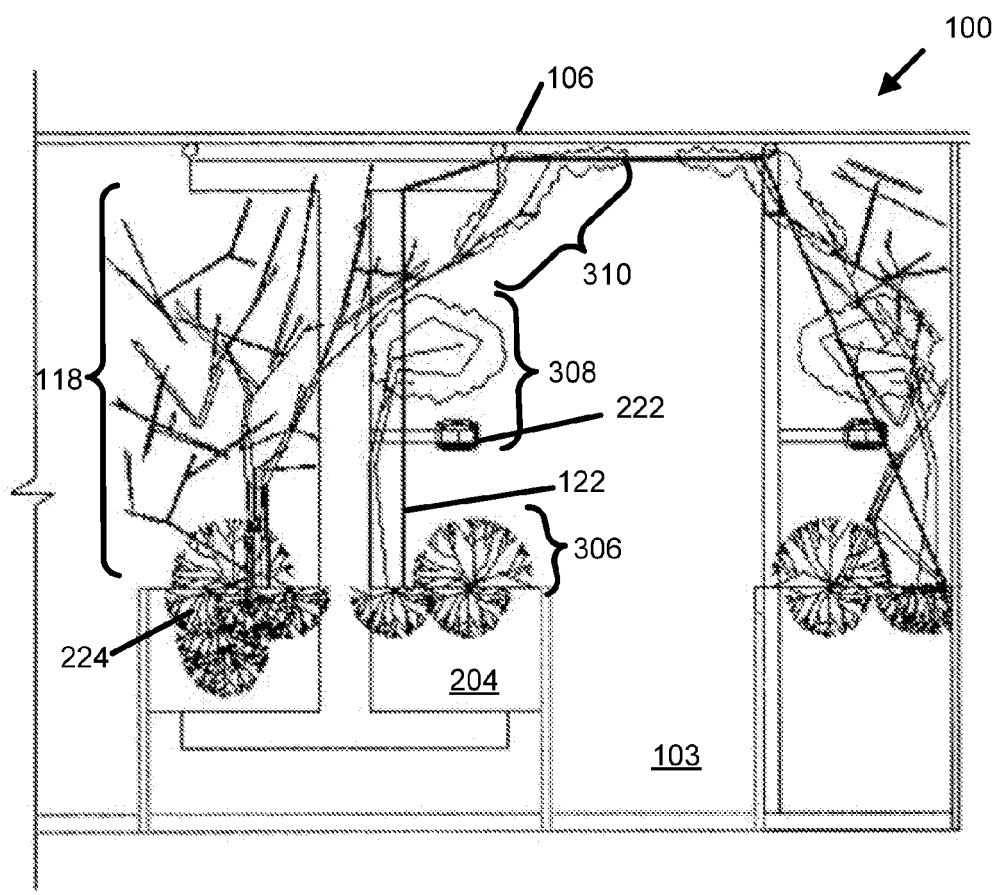
FIG. 3 is a cross-sectional depiction of another embodiment of a self-regulating greenhouse.

In FIG. 3, the greenhouse 100 may comprise multiple tiers of plants 118 growing from the same soil 204, such that the roots 224 of the different plants 118 intertwine. The embodiment depicted in FIG. 3 shows three tiers of plants, however other embodiments may comprise more than three tiers or less than three tiers. The multiple tiers of plants 118 may also provide an ideal situation for picking produce. The plants may all be within easy reach from the walkway 103.

A first tier of plants 306 may comprise plants that grow low to the ground such as but not limited to turnips, radishes, lettuce, mushrooms, potatoes, strawberries, or other root plants. A second tier of plants 308 may comprise plants that are taller than plants in the first tier such as but not limited to beans, squash, or bushes. A third tier of plants 310 may comprise vine plants that can grow on the lattice assembly 122 such as but not limited to peas, tomatoes, or grapes. By using multiple tiers of plants the available space within the greenhouse 100 is maximized and produce can be easily handpicked from the plants 118.

Growing the plants 118 in multiple tiers better regulates the natural environment of the greenhouse 100. Increasing the volume of plant mass in the greenhouse 100 decreases the volume of air within the greenhouse 100 that needs to be circulated. This allows for the air to be circulated faster and cheaper than in a similar greenhouse 100 with only a single tier of plants 118. Additionally, the increased plant mass will also act as natural insulation by retaining heat in the plant mass throughout a warm period and releasing some of the heat during a cold period.

In the embodiment depicted in FIG. 3, the third tier of plants 310 may provide shade for the second tier of plants 308 and the first tier of plants 306. The second tier of plants 308 and the third tier of plants 310 may provide shade for the first tier of plants 306. This may be beneficial in some climates where additional shade would be required to grow certain plants. For example, having a heavily shaded first tier of plants 306 may provide a good environment for the growth of mushrooms.

In some embodiments, the greenhouse 100 may comprise LED lights 222 disposed between the first tier of plants 306 and the second tier of plants 308 to provide additional light to the first tier of plants 306 in situations where too much shade is being provided. Similar LED lights 222 may be disposed between the second tier of plants 308 and the third tier of plants 310. The LED lights 222 may be in communication with the photovoltaic panel (not shown), the supplementary battery, or the additional power source. The LED lights 222 may automatically turn on when light levels drop below a certain point, or the LED lights 222 may be actuated by a timer.

The air flow system 102 may also help provide additional heat to the plants 118 in the shaded first tier 306 and the shaded second tier 308 by warming the soil 204 during the day. As the fan 116 pushes hot air during the midday into the soil 204, the soil 204 may warm. The warm soil 204 may provide additional warmth to the first tier of plants 306 and the second tier of plants 308, especially in situations where the first tier 306 and the second tier 308 are being provided too much shade.

Figure 4A:
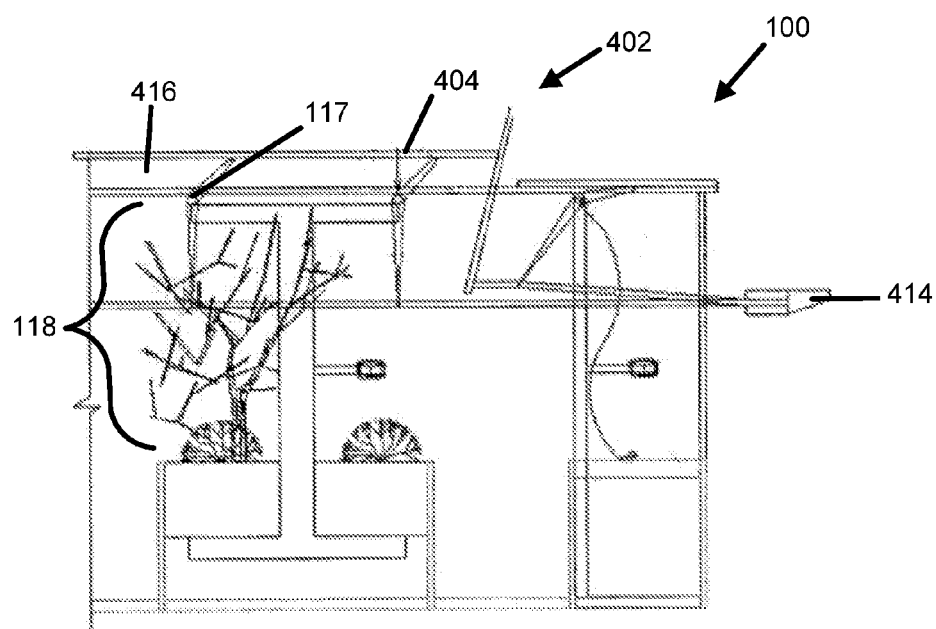
FIG. 4A is a cross-sectional depiction of another embodiment of a self-regulating greenhouse.

FIG. 4a depicts an embodiment of a greenhouse 100 that comprises a roof ventilation system 402. In this embodiment, the roof 404 of the greenhouse 100 may comprise overlapping transparent sheets 406 (shown in FIG. 4B and FIG. 4C). The transparent sheets 406 may be supported on the tube-and-ductwork structure 117.

The tube-and-ductwork structure 117 may comprise rotatable tubes 408. The rotatable tubes 408 may have arms 410 extending from them. At least one of the overlapping transparent sheets 406 may be attached only to the extending arms 410 and not to the rotatable tubes 408, such that when the rotatable tubes 408 are rotated the extending arms 410 also rotate causing at least one overlapping sheet 406 to be lifted above adjacent sheets 412 creating a gap 416 in the roof 404.

Figures 4B, 4C:
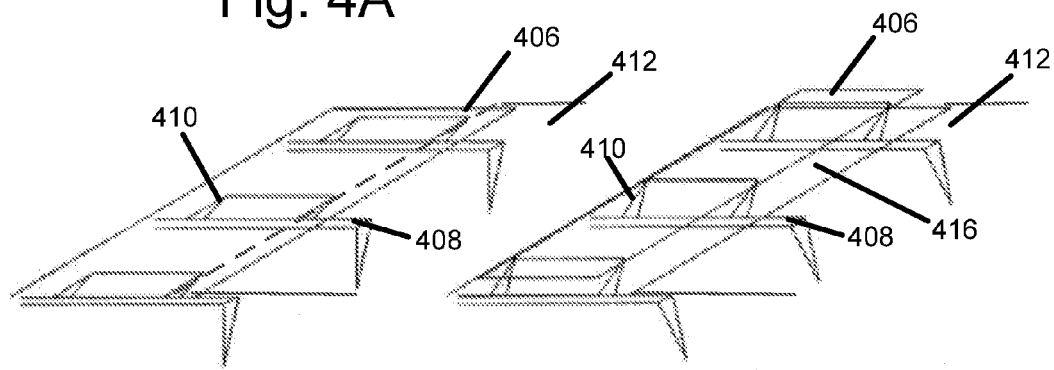
FIG. 4B is a perspective view of an embodiment of a closed roof ventilation system.
FIG. 4C is a perspective view of an embodiment of an open roof ventilation system.

FIG. 4B shows an overlapping transparent sheet 406 lying flat with reference to adjacent sheets 412. In this depiction, the rotatable tubes 408 have not been rotated but are in a neutral position. FIG. 4C shows an overlapping transparent sheet 406 that has been lifted above adjacent sheets 412 by rotating the rotatable tubes 408.

In some embodiments, only selected transparent sheets 406 are attached to the extending arms 410. For example, every second transparent sheet is attached to the extending arms 410 so that a lifted transparent sheet 406 is adjacent at least one transparent sheet 406 that is not lifted by the extending arms 410. In a further example, every third transparent sheet 406 is lifted by an extending arm 410. Alternatively, the number of transparent sheets 406 that are attached to extending arms 410 depends on the heating/cooling requirements of the greenhouse 100. The rotatable tubes 408 may also be in communication with a control lever 414 or some other control device such that when the lever 414 or control device is actuated the rotatable tubes 408 rotate causing every other transparent sheet 406 to lift.

It may be beneficial at times to create a gap 416 in the roof 404 to allow fresh air into the greenhouse 100, to exhaust humid air, or to cool the greenhouse 100. Creating the gap 416 in the roof 404 may also provide an opportunity for pollinating insects, such as bees and butterflies, to enter the greenhouse 100 and pollinate the plants 118.

The roof ventilation system 402 may be in communication with an electronic actuator (not shown) such that the system 402 is electronically controlled. In some embodiments, the roof ventilation system may be controlled by an electronic timer or by a computer. In other embodiments the roof ventilation system 402 may be manually controlled.

In some embodiments, the roof may comprise a peaked roof (not shown) with the roof ventilation system 402 extending on both sides of the peak. In FIG. 4a, the roof comprises a flat roof. A peaked roof may provide the benefit of allowing snow and rain to more easily run-off the greenhouse 100. A flat roof may provide the benefit of minimizing wasted growing space by eliminating the space that would be present in the peak of a peaked roof.

Figure 5:
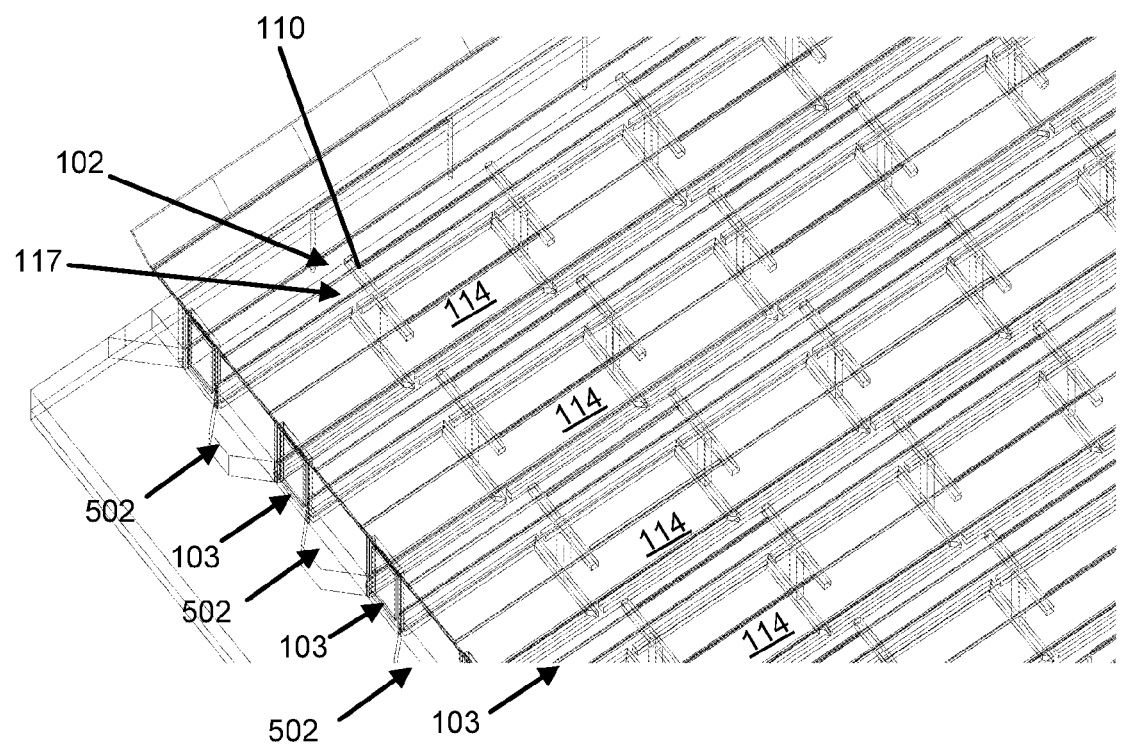
FIG. 5 is a perspective view of an embodiment of a self-regulating greenhouse.

FIG. 5 depicts a greenhouse 100 with several growing bed rows 502 and several different rows of excavated walkways 103. In this embodiment there are several air flow systems 102 disposed within the growing beds 114. The air flow systems 102 may be disposed approximately one per every thirty-six square feet of growing bed 114 surface.

The growing beds 114 may be approximately four feet wide, such that two individuals positioned on opposite sides of a growing bed 114 may easily reach a center area of the growing bed 114. The various excavated walkways 103 may be connected to each other by additional horizontal walkways (not shown).

In this embodiment, there may be several photovoltaic panels (not shown) in communication with the various air flow systems 102 as described above. The air flow systems 102 may also all be in communication with an additional power source such as a standard power line. The air flow systems may all be in communication with the same power source or photovoltaic panel such that the fans are all synchronized to start and stop at the same time. The air flow systems 102 may also be in communication with independent power sources such that the fans 116 activate at different times.

The air flow systems 102 may be in communication with each other. In some embodiments the lower horizontal ductwork 108 of each air flow system within a growing bed row 502 may be in communication with each other such that when air is pulled into any individual air intake apparatus 110 that air may travel the entire length of the growing bed row 502, passing through several different air flow systems 102, before being exhausted back into the greenhouse 100.

In another embodiment, each growing bed row 502 may comprise a single tube-and-ductwork structure 117. The tube-and-ductwork structure 117 may comprise rotatable tubes 408 and air flow systems 102. The rotatable tubes 408 may be used to transport water.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A greenhouse comprising:
   a structure comprising walls and a roof;
   an external surface of the structure comprising a transparent membrane allowing sunlight to enter the structure;
   an air flow system disposed within the structure comprising;
   a horizontal air pathway disposed within a growing bed;
   a vertical air pathway extending upward from the horizontal air pathway through the growing bed to an air intake apparatus positioned adjacent the roof; and
   wherein the growing bed is a raised growing bed, and wherein the horizontal pathway extends through the growing bed to circulate air from the air intake apparatus into the structure.

2. The greenhouse of claim 1, wherein the raised growing bed has at least one interior sidewall, and wherein the horizontal air pathway extends through the at least one interior sidewall to circulate air from the air intake apparatus into the structure.

3. The greenhouse of claim 2, further comprising a plurality of raised growing beds and a walkway formed between adjacent raised growing beds.

4. The greenhouse of claim 3, further comprising a breathable waterproof membrane disposed between the horizontal air pathway and soil in the growing bed to prevent water from entering the horizontal air pathway, and configured to direct water towards a drain formed in the interior sidewall, and wherein the walkway further comprises a collection path for collecting the water.

5. The greenhouse of claim 1, further comprising an insulating layer disposed between the horizontal air pathway and the ground.

6. The greenhouse of claim 1, wherein the air flow system further comprises a forced air device in electrical communication with a photovoltaic panel such that the speed of the fan is controlled by the power output of the panel in response to the solar output of the sun.

7. The greenhouse of claim 1, wherein the forced air device is in communication with one of a battery system or an alternating current power system.

8. The greenhouse of claim 1, further comprising at least one of a powered system of fans, LED lights, and candles to extend growing times.

9. The greenhouse of claim 1, wherein the roof is formed of at least a first transparent sheet coupled with a rotatable arm and an adjacent second transparent sheet coupled with an extending arm such that when the extending arm lifts the second transparent sheet an opening is formed in the roof between the first and second transparent sheets to allow a flow of air between an interior of the structure and an exterior of the structure.

10. A system comprising:
a structure comprising walls and a roof;
wherein the roof is formed of at least a first transparent sheet coupled with a rotatable arm and an adjacent second transparent sheet coupled with an extending arm such that when the extending arm lifts the second transparent sheet an opening is formed in the roof between the first and second transparent sheets to allow a flow of air between an interior of the structure and an exterior of the structure an external surface of the structure comprising a transparent membrane allowing sunlight to enter the structure;
an air flow system disposed within the structure comprising;
a horizontal air pathway disposed within a growing bed;
a vertical air pathway extending upward from the horizontal air pathway through the growing bed to an air intake apparatus positioned adjacent the roof;
a forced air device in electrical communication with a photovoltaic panel such that the speed of the fan is controlled by the power output of the panel in response to the solar output of the sun; and
wherein the growing bed is a raised growing bed, and wherein the horizontal air pathway extends through the growing bed to circulate air from the air intake apparatus into the structure.

11. The system of claim 10, wherein the raised growing bed has at least one interior sidewall, and wherein the horizontal air pathway extends through the at least one interior sidewall to circulate air from the air intake apparatus into the structure.

12. The system of claim 11, further comprising a plurality of raised growing beds and a walkway formed between adjacent raised growing beds.

13. The system of claim 10, further comprising a breathable waterproof membrane disposed between the horizontal air pathway and soil in the growing bed to prevent water from entering the horizontal air pathway, and configured to direct water towards a drain formed in the interior sidewall, and wherein the walkway further comprises a collection path for collecting the water.

* * * * *